United States Patent
Sarmento (10) Patent No.: US 8,726,062 B2
(45) Date of Patent: May 13, 2014

(54) DATA RECOVERY ARCHITECTURE (CDR) FOR LOW-VOLTAGE DIFFERENTIAL SIGNALING (LVDS) VIDEO TRANSCEIVER APPLICATIONS

(75) Inventor: Jose Angelo Rebelo Sarmento, Via Nova de Gaia (PT)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/309,528

(22) Filed: Dec. 1, 2011

(65) Prior Publication Data
US 2012/0106688 A1    May 3, 2012

Related U.S. Application Data

(62) Division of application No. 11/950,179, filed on Dec. 4, 2007, now Pat. No. 8,090,971.

(51) Int. Cl.
*H04B 1/38*    (2006.01)

(52) U.S. Cl.
USPC ........... 713/400; 713/401; 713/500; 713/501; 713/502; 713/503; 713/600; 713/601; 375/219; 375/359; 375/371; 375/375

(58) Field of Classification Search
USPC ................ 713/400–401, 500–503, 600–601; 375/219, 359, 371, 375
See application file for complete search history.

(56) References Cited

U.S. PATENT DOCUMENTS

| | | | |
|---|---|---|---|
| 7,676,011 B2* | 3/2010 | Ker et al. | 375/373 |
| 7,801,203 B2 | 9/2010 | Chen et al. | |
| 2007/0248201 A1* | 10/2007 | Ker et al. | 375/355 |
| 2008/0298476 A1 | 12/2008 | Bereza et al. | |
| 2009/0052600 A1 | 2/2009 | Chen et al. | |

* cited by examiner

*Primary Examiner* — M Elamin
(74) *Attorney, Agent, or Firm* — Bever, Hoffman & Harms, LLP; Jeanette S. Harms (57) ABSTRACT

The present invention discloses data recovery architecture (CDR) to improve a multi-link system's tolerance to delay mismatches (or skewing effect) in its different links. The architecture is entirely digital and usable in any multi-link transceiver implementation that makes use of a separate clock link and requires timing synchronization between the different data links.

17 Claims, 9 Drawing Sheets

DATA RECOVERY ARCHITECTURE (CDR) FOR LOW-VOLTAGE DIFFERENTIAL SIGNALING (LVDS) VIDEO TRANSCEIVER APPLICATIONS

RELATED APPLICATIONS

This application is a divisional of U.S. patent application Ser. No. 11/950,179, entitled "Data Recovery Architecture (CDR) For Low-Voltage Differential Signaling (LVDS) Video Transceiver Applications" filed Dec. 4, 2007, now U.S. Pat. No. 8,090,971.

TECHNICAL FIELD OF THE INVENTION

This invention relates to data communication systems. More particularly, this invention relates to multilink recovery systems and especially to LVDS data recovery.

BACKGROUND OF THE INVENTION

Low-Voltage Differential Signaling (LVDS) is the method of choice for transmission of video data to Liquid-Crystal Display (LCD) panels, an area of recent fast-increasing importance in consumer electronics. An LVDS video transceiver receives video data and maps it to the Red-Green-Blue (RGB) format for post-processing and resending to the LCD panel. With the advent of High-Definition Television (HDTV) systems, such transceivers are required to withstand increasingly higher operating clock frequencies, and also tolerate the spread-spectrum modulation of clock and data often required to comply with radiation emission restrictions. The former limits the tolerance to delay skewing between the different channels of the transceiver, while the later poses problems to Clock and Data Recovery (CDR) circuits that must track data during video blanking periods.

Conventionally, timing recovery is performed only on the clock link by means of a delay-locked loop (DLL) circuit, and the resulting multiphase clock is used to directly sample the data links; the timing precision provided by the DLL must then accommodate not only the delay mismatch between the links but also the timing jitter in them.

At high frequencies the precision provided by the DLL is unsatisfactory. This invention dissociates the issues of delay mismatch tolerance and jitter tolerance, yielding maximal performance in both aspects.

SUMMARY OF THE INVENTION

The present invention discloses data recovery architecture (CDR) to improve a multi-link system's tolerance to delay mismatches (or skewing effect) in its different links. The architecture is entirely digital and usable in any multi-link transceiver implementation that makes use of a separate clock link and requires timing synchronization between the different data links.

In the present invention, a fully digital clock and data recovery architecture for Low Voltage Differential Signaling (LVDS) video applications is described. The architecture is modular and expandable to any number of LVDS video channels, and makes use of a shared Phase-Locked Loop (PLL) to generate a multi-phase clock signals required for its operation. In one embodiment, data is tracked on all video channels instead of merely the clock channel to increase channel skew tolerance. Clock and Data Recovery (CDR) circuits track clock and data channels during video blanking periods.

BRIEF DESCRIPTION OF THE DRAWINGS

Following, it is briefly described some figures that helps to better understand the invention. The figures also describe an embodiment of the present invention, as non-imitative example.

The present invention is described with reference to the accompanying drawings. The drawing in which an element first appears is typically indicated by the leftmost digit or digits in the corresponding reference number.

DETAILED DESCRIPTION OF THE PREFERRED EMBODIMENTS OF THE INVENTION

Firstly, an overview of the video LVDS standard and its characteristics is given, in order to specify the various aspects of the present invention.

The Video Electronics Standards Association (VESA) has standardized the physical coding and electrical characteristics of LVDS data transmission in video applications through the TV Panels Standard [*VESA TV Panels Standard, version 1, Video Electronics Standard Association Std.*, 2006], which has become the de facto standard in LCD panel applications, along with the Open LVDS Display Interface Specification (OpenLDI) standard [*Open LVDS Display Interface Specification, version 0.95, National Semiconductor Std.,* 1999], which is architecturally similar.

The TV Panels Standard architecture relies on the Telecommunications Industry Association (TIA) standard TIA/EIA-644, which defines the electrical characteristics of the LVDS data [*Electrical Characteristics of Low-Voltage Differential Signaling Interface Circuits, Telecommunications Industries Association/Electronic Industries Alliance Std.* 644, 1996]. Following these characteristics, a multi-link configuration is employed, with one LVDS channel (differential pair) being used for clock transmission and the remaining channels being used for actual video data transmission. The number of data channels in the system is a direct function of the desired color resolution, ranging from 3 channels (6 bits of color per RGB video component, for a total of 18-bit color) to 8 channels (48-bit color, 16 bits per RGB component). Video transmission is done in a continuous stream, with all information pertaining to one pixel of video data being sent in each line clock cycle. The LVDS line clock is therefore usually referred to as the pixel clock. Frequency of the pixel clock is directly related to the required bandwidth, in pixels per second, required in the television system. This can be determined from the LCD panel's resolution and the desired frame refresh rate as:

$$F_{pixelclock} = N_{lines} \times N_{columns} \times F_{refresh} \times (1+\alpha);$$

Where α represents an overhead relative to the visible screen resolution. Due to the large variety of panel resolutions and frame rates in television transmission standards, a wide range of operating frequencies must typically be supported in an LVDS video transceiver.

Multi-link systems that require timing synchronization between their different links (for example, in LVDS video transceivers) must carefully match the timing delay between their links to ensure the required synchronization. This tight matching often constrains System-on-chip routing, chip packaging options, PCB design, and cable construction, affecting overall system cost budgeting. This is particular evident at high operating frequencies, which are becoming increasingly required in video applications.

The clock and data recovery (CDR) architecture of the present invention satisfactorily implements LVDS video data recovery in a scalable multi-link configuration. The architecture is able to track frequency modulation of data and pixel clock signals to accommodate EMI requirements in a commercial transceiver implementation, and features original approaches to accommodate line skew and retain phase tracking during absence of data.

One advantage of the present invention is related to the fact that a digital clock and data recovery (CDR) circuit is employed for each link. The condition for timing synchronization to be attained can be shown to be entirely dependent on the initial sampling point of the CDR circuits: if two CDRs start their operation by sampling different bit positions, they will become inevitably de-synchronized, and if they start by sampling the same bit positions, they will retain synchronism.

A distinct digital clock and data recovery circuit is used to determine the timing position of the clock link's rising edges by use of a multi-phase clock. From this, an adequate starting point (clock phase) is determined for all the other CDRs, which make use of the same multiphase clock. This starting point will fall beyond the maximum specified timing variation between the links, and ensures a maximal theoretical skew tolerance of 37.5% of the operating data frequency.

Figure 1:
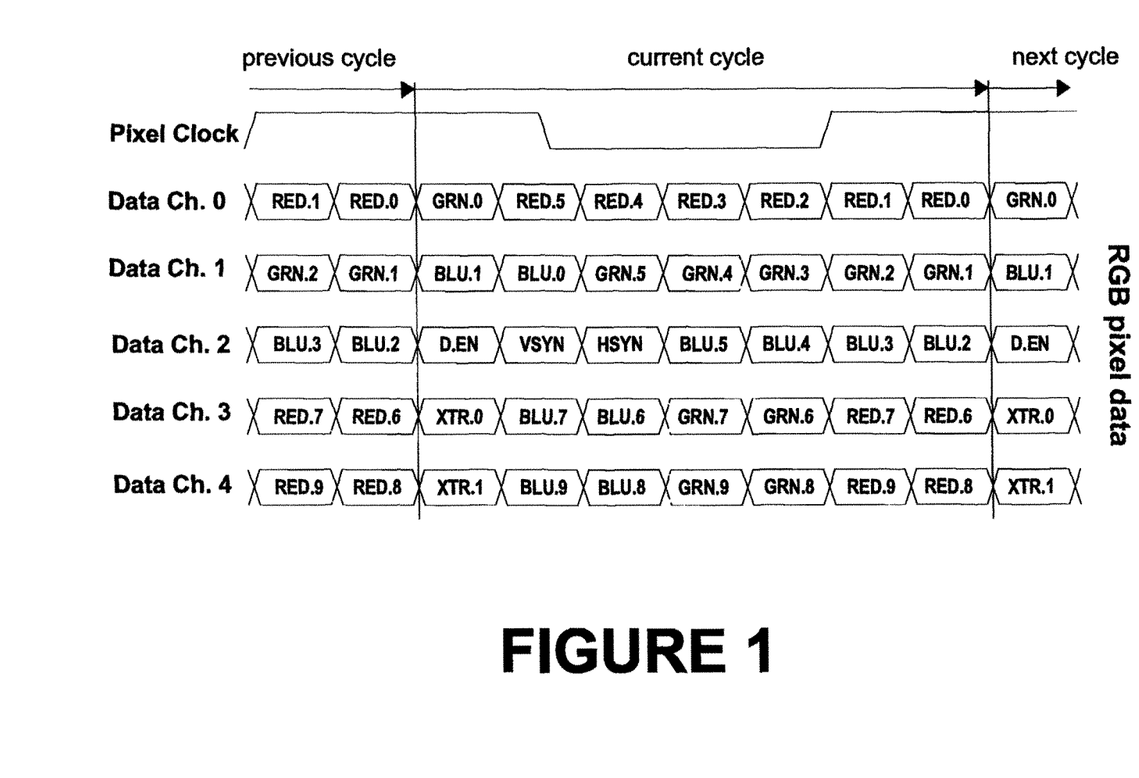
FIG. 1.—Shows the video data framing by the video clock.

As can be seen in FIG. 1, the video transmission is done in a continuous stream, with information pertaining to one pixel of video data being sent in each line clock cycle. The LVDS line clock is therefore usually referred to as the pixel clock. Frequency of the pixel clock, in pixels per second, is directly related to the bandwidth, required in the television system.

In view of the scalable multi-link nature of the VESA standard, the digital CDR architecture of the present invention relies on multi-phase clocks provided by a shared PLL to minimize silicon area and power consumption. Design of the shared PLL, although independent to a large extent of the CDR implementation, cannot be fully decoupled from it, and both transceiver blocks must be considered as a whole from a system application perspective.

Figure 2:
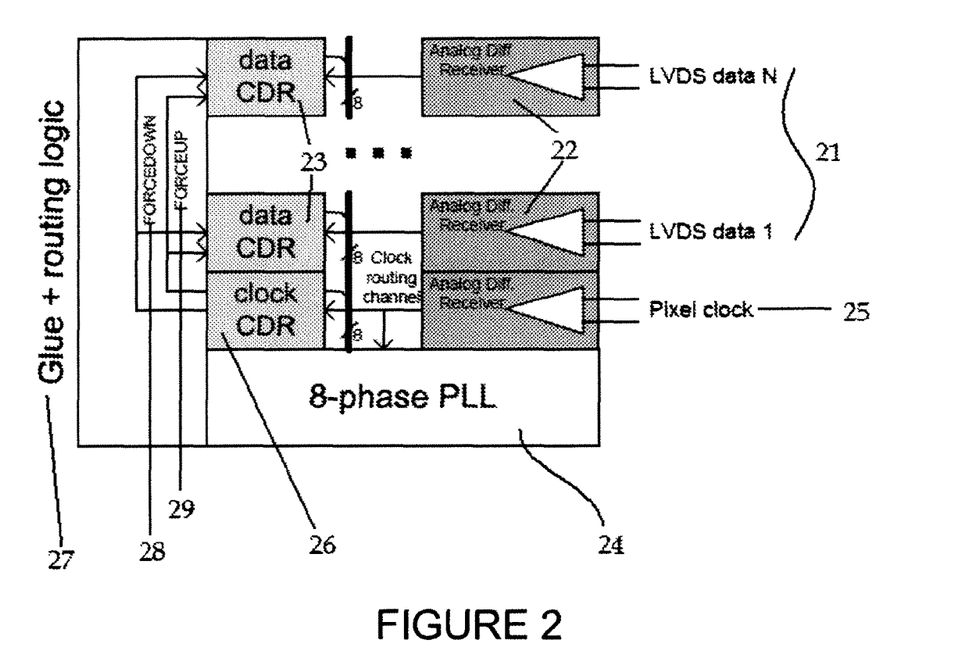
FIG. 2.—Shows a combined block diagram of the PLL and CDRs.

A combined block diagram of the PLL and CDRs is shown in FIG. 2. There it can be seen a plurality of LVDS channels (21) connected to a plurality of analog differential receiver (22) circuits, at least, one receiver (22) per incoming channel (21). The receiver (22) circuits outputs are directly connected to corresponding data CDR (23) circuits. The architectural base comprises a blind oversampling digital CDR (23) circuitry employing "n" clock phases from a ring oscillator PLL (24) for timing recovery. Note that "n" may be 8, 16 or some other even integer; however it is preferred that n be a power-of-2 for simpler indexing with M bits. In one preferred embodiment, PLL 24 may be a voltage controlled oscillator (VCO) capable of providing a non-fixed frequency ratio output clock. A preferred PLL is described in commonly assigned provisional application Ser. No. 60/973,152 filed Sep. 17, 2007, entitled High Range PLL Clock Multiplier.

Thus, PLL 24 may provide a clock that is a multiple of the data rate such as a 2× or a 4× multiple. Rather than providing a single multiphase clock of, by way of example, 1 GHz to recover data at 1 Gb/s, the PLL can provide the same clock phase to allow the CDR to recover data at 500 Mb/s or 250 Mb/s. This allows the PLL to work with a non-fixed frequency ratio and the CDR can tolerate the higher clock rate.

These PLL phases are fed through the stack of LVDS channels (21) in a dedicated routing channel to provide adequate shielding and matching. The PLL (24) generates the multiphase clock at the same frequency as the line data rate.

A pixel clock LVDS channel (25) is also retimed by a dedicated CDR (26) circuit to achieve word (pixel) alignment with the other CDRs (23). In this architectural embodiment, signals are routed from the clock channel CDR (26) to the data channel CDRs (23) through a standard digital block (27). This digital block (27) also provides feed-through logic (e.g., buffers and routing logic) and performs, in one embodiment, serial-to-parallel conversion and LVDS-to-RGB de-mapping functions. The forcedown (28) and forceup (29) signals coming from the Clock CDR (26) provide a phase update to the data CDRs (23) whenever the clock CDR's (26) phase is changed.

In both the clock and data channel CDRs (26) and (23), respectively, the same base technique is employed to sample the incoming serial stream with the n PLL clock (24) phases and synchronize the result of this sampling to one single digital clock, which is used for the CDR function itself. In one embodiment, a subcircuit, shown in FIG. 3, outputs the signal timing information in digital (sample) form.

Figure 3:
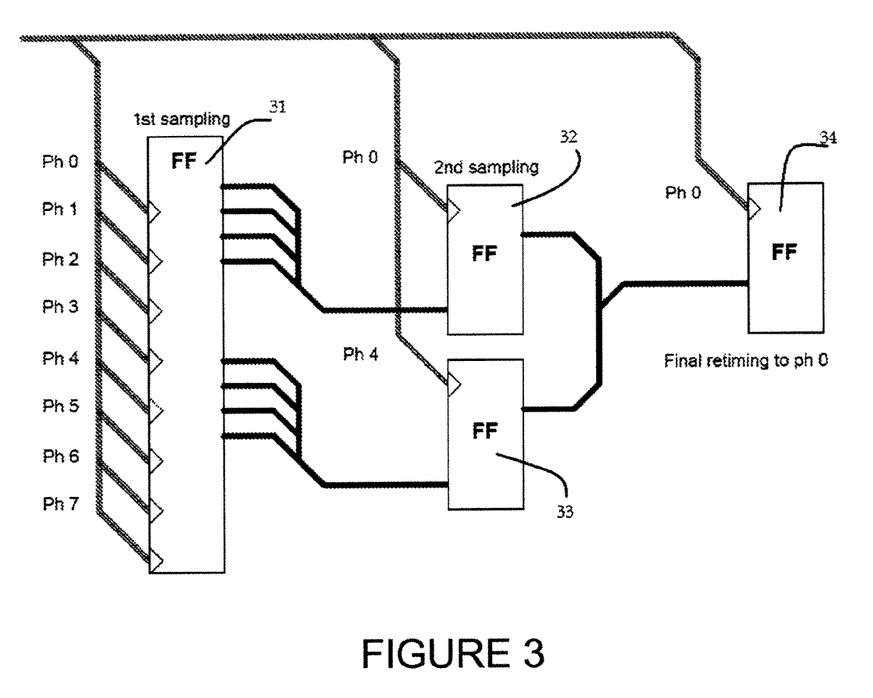
FIG. 3.—Shows the progressive retiming of the input signal to a single digital clock.

The FIG. 3 shows a synchronizing circuit comprising, at least, a first sampling (31) stage. Sampling stage 31 is implemented by a number of flip-flops where the number of flip-flops correspond to the number of clock phases used in a particular embodiment. Sampling stage 31 samples the incoming serial stream with each clock phase (e.g., phase 0 to phase 7) providing n digital outputs. The outputs of said first sampling stage (31) are connected to a second sampling stage where they are divided into a first flip-flop bank (32) clocked with the phase 0 signal, and second flip-flop bank (33) clocked with the phase 4 signal which is selected based on the formula of n/2. The outputs of both flip-flop banks 32 and 33 are the input signals to the final retiming stage (34) synchronized with the phase 0 signal, obtaining data synchronized to a single digital clock signal. The phase 0 signal is, in this embodiment, arbitrarily chosen as the processing clock.

The entire CDR circuit is implemented in a digital design flow using industry-ready standard cells. However, cell placement and matching is critical for the first sampling stage as any asymmetries presented will degrade the performance of the CDRs. Accordingly, it is preferred that manual cell placement be used to implement the synchronizing circuit in silicon.

Figure 4:
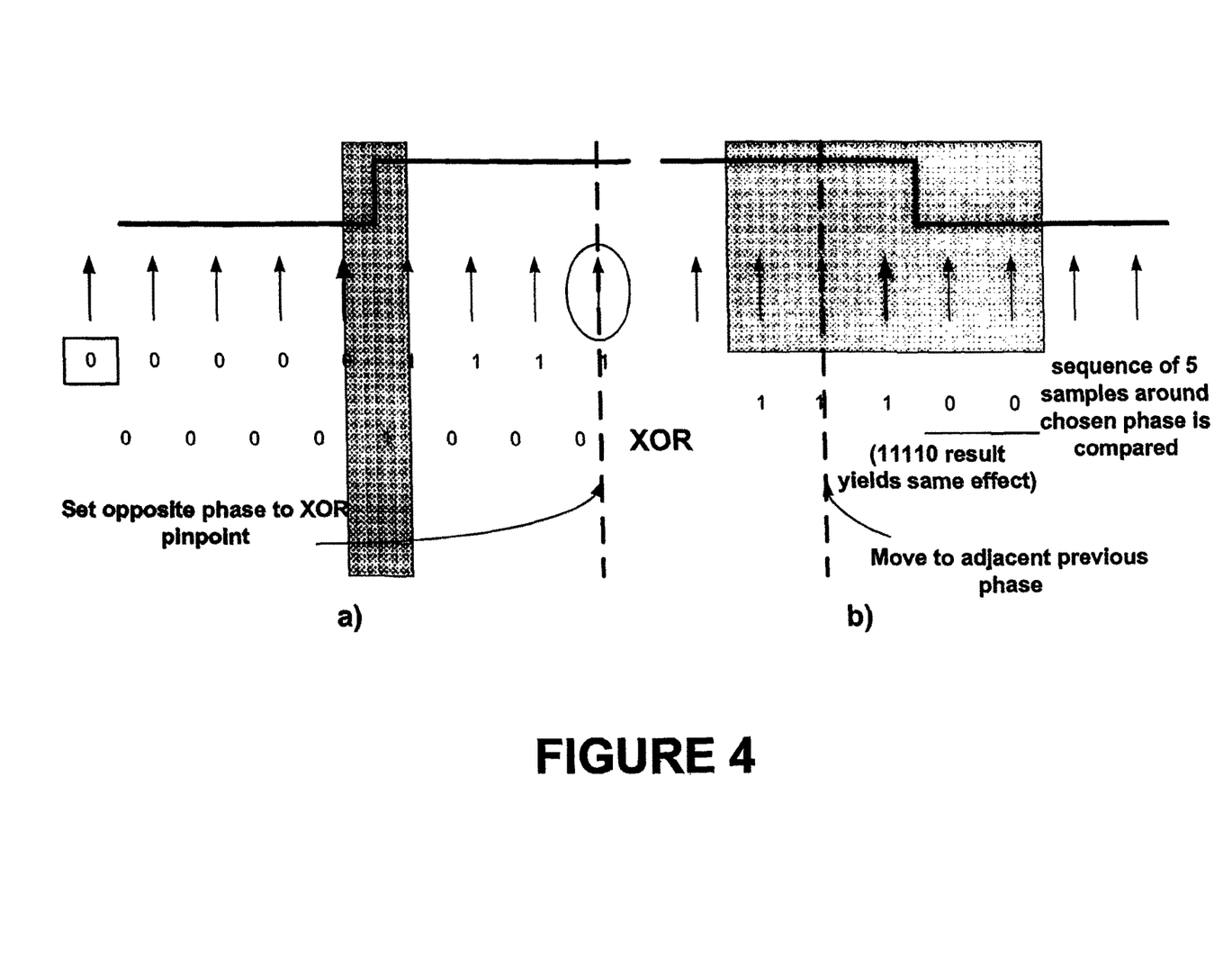
FIG. 4.—Shows the Blind oversampling algorithms used in the (A) clock and (B) data channel CDR.

The data channel CDRs use a true blind oversampling architecture, shown in FIG. 4. The sampling result of a central (data) phase is compared with that of the two adjacent phases on each side. Should the samples be different, the chosen data phase is adjusted to its next or previous phase so as to meet the condition where all five sample results will be the same. The starting data phase is indicated by the clock channel CDR.

The comparison algorithm represented in the FIG. 4 can be summarized in table 1, where a sequence of five samples around chosen phase is compared:

| {prev.sample −2; prev.sample −1; actual sample; next sample +1; next sample +2} | Phase adjustement |
|---|---|
| 00000 or 11111 | Stay with current |
| 10000 or 01111 or 11000 or 00111 | Move to next phase |
| 00001 or 11110 or 11100 or 00011 | Move to previous phase |
| All other values | Stay with current |

The clock channel CDR 26 uses a distinct architecture compared to the data channel CDRs. In one embodiment, it employs a matrix of XOR gates to determine the clock phase interval where the rising edge of the incoming clock is located, as detailed in FIG. 4. From this, it computes an adequate phase for starting off the data channel CDRs to ensure proper word alignment. Specifically, a plurality of samples are taken to detect a transition. For an initial set of samples, a pinpoint is defined such that the last sample has the opposite phase so as to bracket the clock's transition. A phase farthest from (e.g., 180 degrees from) the bracketed clock transition is then selected as the initial point of the data channel CDRs.

The clock CDR instantaneously changes to the phase deemed as correct from the XOR matrix analysis, while the data CDRs are limited to adjust only in incremental steps of ±1 phase in order to ease the implementation and allow for the maximum target operating frequency to be attained. Both circuits react based on one single multiphase sampling result instead of an average or accumulated sampling history, again to simplify the resulting circuit paths and avoid excessive pipelining, which would degrade performance and compromise tracking capability. It should be noted that the algorithm employed in the data CDRs already possesses an innate filtering effect, albeit highly nonlinear—small phase errors will be discarded by the phase comparison circuit because all five used samples to fall inside the data valid region.

To ensure stable operation, a simple inhibitor flag circuit is included in the data CDRs to disregard the phase comparison algorithm's indications while a phase adjustment is taking place. This flag is thus set when the phase comparison circuit instructs the CDR to change phase, and held while the resulting adjustment is processed and propagated through the feedback loop. After three clock cycles, the phase comparison circuit will be outputting data based on the new adjusted phase, and the flag is reset. No similar mechanism is required in the clock CDR as it effectively contains no feedback loop: the intended phase is simply computed in each clock cycle, and does not affect the subsequent response of the circuit.

The transceiver CDRs must adequately retime incoming corrupted data (compliant to a specified worst-case eye diagram) from the respective LVDS stream. Each transceiver CDR must possess sufficient phase-tracking capability to accommodate the phase error resulting from the PLL's tracking of the input clock. Each transceiver CDR must also be able to retain proper tracking even following long time spans where no data transitions are present (blanking regions in the LCD panel), even under spread-spectrum frequency modulation of their input. Finally, they must operate in a synchronized fashion to achieve TV Panels Standard word alignment under a maximum specified channel skew. In the following subsections, the adopted solutions for each of these referred critical aspects are presented.

CDR Design—Adequate Retiming:

LVDS video transmission, according to the TV Panels Standard, is done in a continuous stream; although this poses the difficulty of achieving word alignment in the absence of, for example, packet SYNC fields. However, it allows for a near-infinite locking time for the PLL+CDRs subsystem, considering that the LVDS video transceiver system is also source-synchronous and phase error will not accumulate indefinitely over time due to any frequency offset. CDRs for this application are preferably realized with a narrow bandwidth to maximize jitter filtering. However, the need for spread-spectrum frequency modulation will require the CDRs to track a small but non-negligible frequency offset, resulting from the PLL's lag in following the input frequency. Therefore, in one embodiment, the loop bandwidth is selected to be as large as possible while still making the design feasible at the desired operating frequency. The blind oversampling CDR will thus adjust phase based on a single data sample; to retain stability, further phase sampling information is inhibited to the loop decision engine while a phase adjustment is taking place.

As the CDR's loop takes two clock cycles to update, it is possible to adjust one phase every three clock cycles. This achieves a maximum tracking bandwidth at around Fdata/6 from the Nyquist theorem. The algorithm's non-linearity, specifically its discretization of phase errors to 0 or ±1 and its inherent dead zone region, is not considered here for simplicity.

As mentioned before, a total of five consecutive phases are used by the data CDR algorithm, although only the center three are required to be in the stable region of the incoming data for the CDR to retain its sampling point. Considering the inherent distortion of the phases by mismatches in the PLL ring oscillator and clock routing channels, and also the setup and hold timing requirements for the sampling Flip-Flops, our requirement for minimal eye diagram opening is:

$$T_{eye} \geq \frac{(2 + \phi_{dist})}{8} \times T_{bit} + \delta_{quant} + T_{setup} + T_{hold}$$

Where $\delta_{dist}$ represents the maximum PLL phase alignment error $\delta_{quant}$ the discretization error. This error has an upper bound of a nominal phase spacing, which we can consider, along with worst-case setup and hold times of 120 ps and 40 ps respectively, and a maximum phase alignment error of 20%, to yield a minimum eye opening of 56% for a $T_{bit}$ of 1ns, meeting a design specification of 60% horizontal opening (eye width), for a preferred embodiment.

Figure 5:
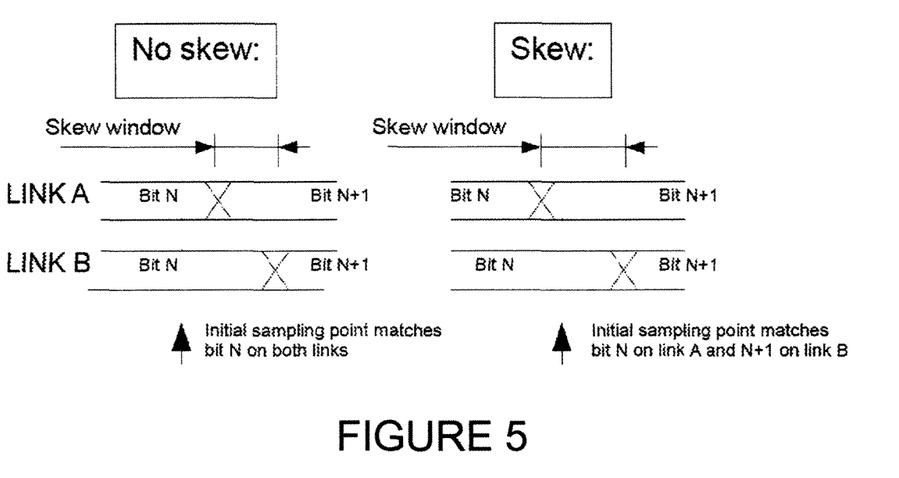
FIG. 5.—Shows the Skew occurrence: A and B links will be unaligned if initial sampling point falls within skew window.

CDR Design—Channel Skew:

As no preamble data is available, word synchronization is preferably achieved by the LVDS transceiver CDRs from the line clock itself. This will be critical in the presence of excessive timing skew between the different LVDS data streams, which will naturally always be present e.g. due to cable and Printed Circuit Board (PCB) trace asymmetries in any practical application. Considering only the data channel CDR circuits, they will start at an arbitrary phase choice, or sampling point. This initial sampling point will of course be totally uncorrelated with the incoming data phase; in the event that the initial sampling point corresponds to different pixel bits in any two channels, skewing in the retimed serial streams will inevitably occur, as shown in FIG. 5. This is a sufficient and necessary condition for skewing.

Conventionally, channel skew is budgeted for in the eye tolerance specification. Clock recovery is performed on a single channel and the same retiming clock there computed is used for all channels. Channel skew will thus degrade the performance of the transceiver, and at high operating frequencies may greatly hinder the cable and PCB design. In this implementation, due to a high skew tolerance application requirement, an alternative approach was followed by using a distinct CDR circuit in the LVDS clock channel (which is itself subject to skew relative to all the data channels). This clock CDR circuit is used to eliminate the effect of any channel skew below a certain value, without degrading CDR performance. By determining where the rising edge of the input line pixel clock is in the PLL 8-phase sequence, the data channel CDRs' initial phase is then set to be π rad. apart from this input clock edge, ensuring that the starting point for all data channels will be outside the skew window. Skew tolerance is thus specified between any data channel and the clock channel as:

$$T_{skew} \leq \frac{T_{bit}}{2} - \delta_{phase,max} + \min(T_{setup}, T_{hold})$$

Figure 6:
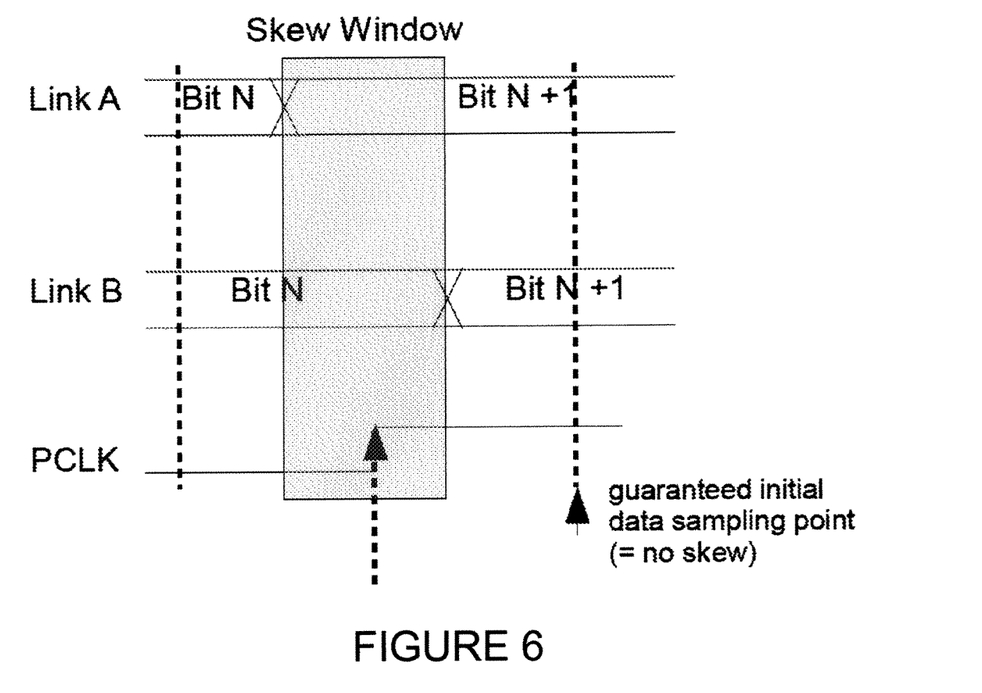
FIG. 6.—Shows how Avoiding skew by setting the initial sampling point for the data channels.

This is graphically shown in FIG. 6. Both $\delta_{phase,max}$ (the maximum time between two adjacent clock phases) and min (Tsetup, Thold) (shortest of Flip-Flops setup and hold timing requirements) refer to the discretization uncertainty; min (Tsetup, Thold) is included because it will prevent the actual line clock edge from being arbitrarily close to the sampling clock phases.

The effect of jitter, both in clock and data channels, will slightly degrade the performance derived in the prior formula, as it is reasonable to assume a worst-case statistical independence of this jitter in data and clock channels. However, the clock CDR's operation to compute the initial phase is performed in the first five captured cycles of the LVDS pixel clock, therefore greatly reducing the statistical peak-to-peak value of the data jitter relative to the clock jitter. Note, that the jitter in the prior formula has therefore been discarded. It should however also be noted that Tskew comprises not only the skew outside the silicon die (due to cable, connector, PCB and bonding wire asymmetries) but also that skew which is internal to the LVDS transceiver, resulting from circuit mismatches in the analog differential receivers due to On-Chip Variation (OCV) effects.

CDR Design—Sufficient Phase Tracking:

The LVDS video system is source-synchronous, as the clock is transmitted additionally to the data; employing a simple PLL system to track the pixel clock will require only a phase tracking capability in the CDRs. However, it should be noted that frequency modulation of the pixel clock and video data is often employed in practical transceiver systems to meet Electro-Magnetic Interference (EMI) regulation requirements by spectrum spreading. In this event, the required phase-tracking capability of the transceiver CDRs will likely exceed the 2π range, as the associated system PLL will inevitably track the frequency modulation with a non-zero lag, creating a bounded zero-average frequency offset, and consequently, a bounded phase offset. This is illustrated for an example simulation in the FIG. 7.

Figure 7:
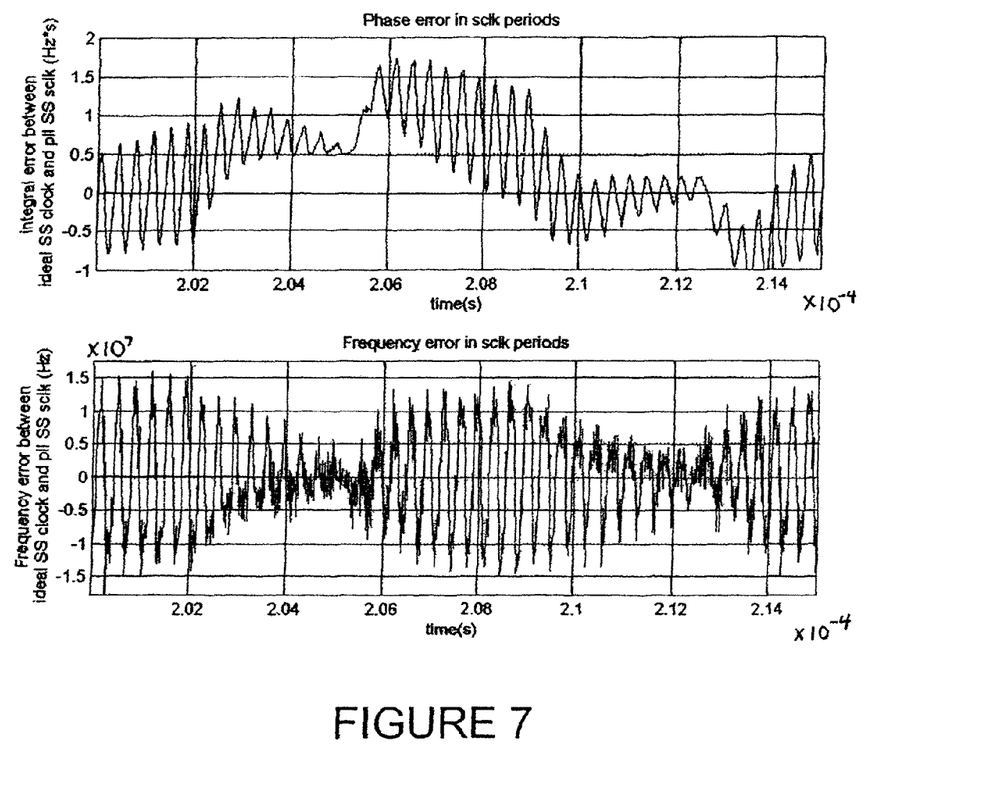
FIG. 7.—Shows an example simulation for the PLL tracking a composite modulated signal.

In FIG. 7, <<sclk>> refers to the PLL output clock, and its nominal frequency is 500 MHz for this simulation. A composite modulation profile was adopted as a specific worst-case scenario. For the PLL design chosen in one embodiment, its resulting phase offset was seen to be bounded under ±2 bit times when using an optimized loop for Spread-Spectrum operation. Persons skilled in the relevant arts will understand how to implement a PLL design to tailor the LVDS system to a specific application. Since the PLL is typically an engineering design choice dependent upon the specific application, it will therefore not be further discussed.

The CDRs must thus be capable of adjusting beyond more than the selectede n phases comprising a single bit. By default, as we are retiming all 8 phases, in one embodiment, to a single one (let us refer to it as phase 0), phase adjustments around this phase (i.e., phase 0 to phase 7 or phase 7 to phase 0) will lead to erroneous sampling, as the retimed phase 0 is always inevitably (7×2π)/8 rad. early relative to the retimed phase 7, and never, for example, 2π/8 rad. late in time. To accommodate the required ±2 bits adjustment, the system must be allowed to go around the retiming phase in either direction (lead or lag) correctly.

Figure 8:
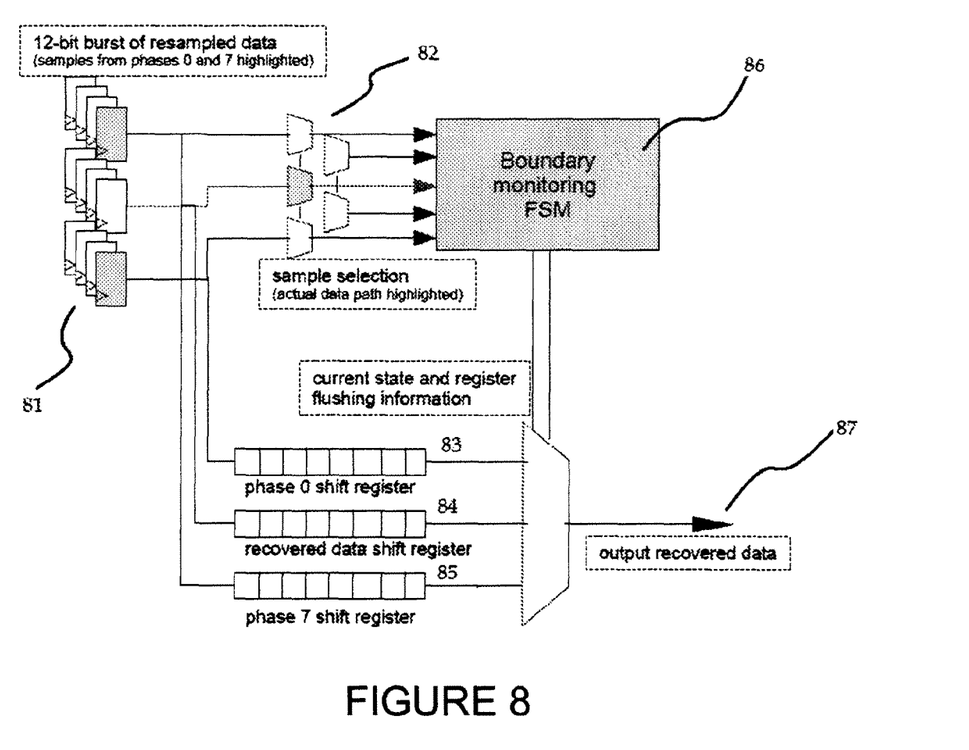
FIG. 8.—Shows how allowing for multiple adjustments across the retiming phase 0.

This is accomplished, in one embodiment, by the circuit illustrated in FIG. 8. The circuit comprising:

A 12 bit burst of re-sampled data (81), wherein the samples from phase 0 and phase 7 are highlighted;

The re-sampled data is connected to the sample selection logic (82), wherein the actual data path is highlighted.

In a parallel structure, the phase 0 re-sampled data is connected to a shift register (83); the phase 7 re-sampled data is connected to a shift register (84) and all phase [0:7] resampled data signals are connected to the recovered data shift register (85).

The samples selected for the CDR algorithm function are connected to the boundary monitoring of the finite state machine (FSM) (86).

The output of the FSM, that is the current state and register flushing information, and the output of the shift registers define the output of recovered data (87).

The mechanism above described works essentially by storing in two separate pipelines samples for the extreme phases 0 and 7. A separate pipeline stores the retimed samples from the time-varying chosen phase. All these pipelines work as FIFOs and the CDRs start by selecting the middle position for the phase 0 and 7 pipelines, while selecting the recovered data pipeline through the output multiplexer. A dedicated Finite State Machine (FSM) monitors the need to go around phase extremes, for example, from phase 0 to phase 7. In that event, the phase 7 pipeline is used temporarily at its immediately previous or next tap while the normal recovered data pipeline is filled with the same (i.e. correct) data from phase 7 (because that is our phase choice now). After a number of cycles equal to the length of the pipelines, we can switch back from the phase 7 pipeline to the normal recovered data pipeline by just tapping a different shift register position before or after the previous tapping point. The process is readily deduced for a phase 7 to phase 0 adjustment in view of the above description.

In the technology used in one implementation of an embodiment of the present invention, the maximum achievable logic complexity for register-to-register logic paths restricted the monitoring FSM's complexity to sixteen states, to which corresponds a phase tracking capability of ±4 bits (±8π rad.). The FSM is extendable indefinitely from a theoretical standpoint, as long as the technology permits the required complexity of 2N states for a tracking capability of $2^{N-2} \times 2\pi$ rad.

CDR Design—Blanking Periods:

A given number of lines and columns in the actual LCD panel application will be invisible to the end user; pixel information sent for these lines and columns is fully blank, represented by an unchanging differential signal in each channel except the ever present pixel clock. In conventional LVDS video transceiver implementations this is not an issue, as only the pixel clock signal is used to derive the retiming information of all links.

However, in the presented embodiment, each CDR follows its own tracking, as mentioned, for improved performance and skew tolerance. In the presence of spread spectrum, the data CDRs have no transitions to rely upon for tracking the varying phase modulating the incoming data channel bits. As such, it would be possible for them to lose phase alignment during the blanking period.

The presented approach to this issue consists in having the clock CDR provide an aid to each data CDR. The force-up and force-down signals coming from the clock CDR (FIG. 2) will mandate a phase update to the data CDRs whenever the clock CDR's phase is changed, ensuring that the necessary phase adjustments take place even in the absence of data line transitions. The direction for the phase update (incremental or decremental) is determined by the minimum difference between the old and new clock CDR phases.

Figure 9:
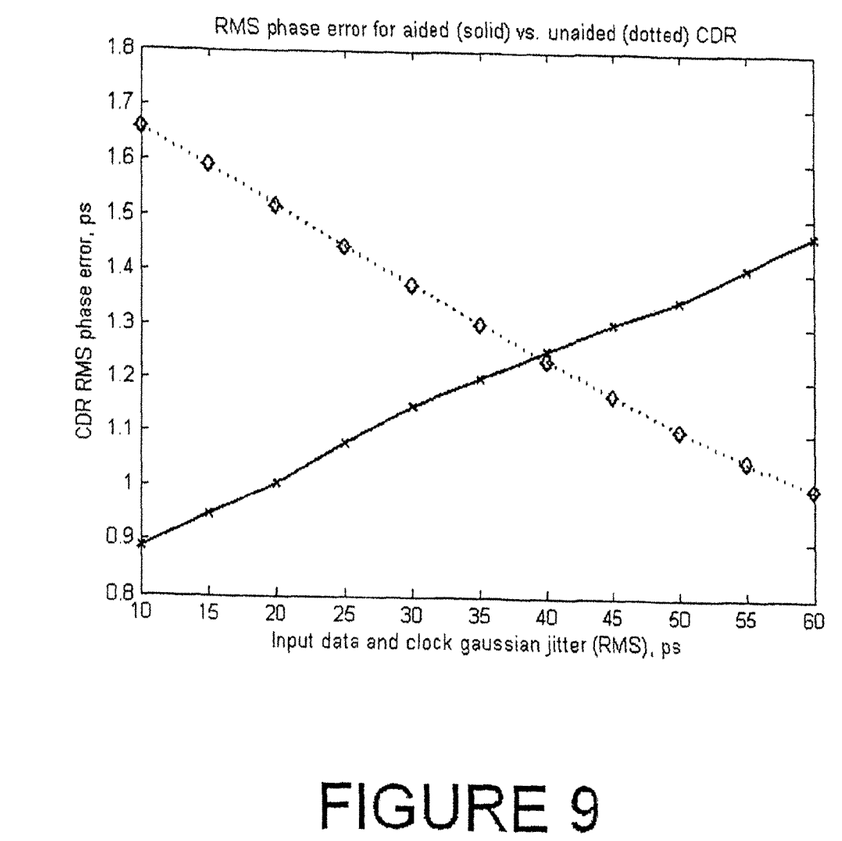
FIG. 9.—Shows a comparison of data CDR performance with and without clock CDR supplementary signals.

From the LVDS transceiver point of view, there is no way to distinguish between a normal video data period and a video blanking period. Therefore, the force-up and force-down indications will always be present, and will be added to the data CDRs' phase comparison algorithm result. This will create additional jitter in the data CDRs' tracking. One design assumption was that this would be a negligible effect; the clock CDR will provide only one adjustment indication during each LVDS pixel clock cycle, with the LVDS pixel clock frequency is seven times lower than the data rate. However, in other embodiments, such design assumption may not be appropriate. During normal video signal transmission the data CDRs will have considerably more transitions of their own to consider, and these will squelch the undesired effect of the clock CDR indications. To validate this assumption, the tracking phase error of the data CDRs was simulated with normal data (a PRBS-23 sequence) as input. The simulation included spread-spectrum modulation of the data and pixel clock, and independent Gaussian jitter was added to both these signals. The comparative error signal of the data CDR with and without the clock CDR indications is shown in FIG. 9.

This FIG. 9 also shows that, for RMS jitter values below 40 ps, the aid provided by the clock CDR's indications in tracking the FM-modulated signal outweighs the added jitter created in the data CDR's tracking (arising from the statistical uncorrelation between the clock and data channel jitter). As jitter is increased beyond 40 ps RMS, the clock CDR begins to hinder the data CDR tracking, but the overall RMS phase error remains satisfactorily small. We have therefore retained the characteristic approach presented.

While various embodiments of the present invention have been described above, it should be understood that they have been presented by way of example, and not limitation. It will be apparent to persons skilled in the relevant arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, SystemC Register Transfer Level (RTL), and so on, or other available programs. Such software can be disposed in any known computer usable medium such as semiconductor, magnetic disk, optical disk (e.g., CD-ROM, DVD-ROM, etc.). Embodiments of the present invention may include methods of providing an apparatus described herein by providing software describing the apparatus and subsequently transmitting the software as a computer data signal over a communication network including the Internet and intranets.

It is understood that the apparatus and method embodiments described herein may be included in a semiconductor intellectual property core, (e.g., embodied in HDL) and transformed to hardware in the production of integrated circuits. Additionally, the apparatus and method embodiments described herein may be embodied as a combination of hardware and software. Thus, the present invention should not be limited by any of the above-described exemplary embodiments, but should be defined only in accordance with the following claims and their equivalence. Furthermore, it should be appreciated that the detailed description of the present invention provided herein, and not the summary and abstract sections, is intended to be used to interpret the claims. The summary and abstract sections may set forth one or more but not all exemplary embodiments of the present invention.

The invention claimed is:

1. A method for maximizing tolerance for channel to channel skew in a low voltage differential signaling (LVDS) system, the method comprising:
    identifying, using a dedicated clock and data recovery circuit (CDR), a rising edge on a pixel clock with a set of bracketing phases; and
    selecting an initial phase for each of a plurality of clock and data recovery circuits (CDRs) receiving data signals,
    wherein the initial phase is an opposite phase farthest from the set of bracketing phases.

2. The method of claim 1, further comprising independently operating each of the plurality of CDRs receiving data signals to maximize the tolerance resulting from channel jitter.

3. The method of claim 1, wherein a multi-phase clock signal for the plurality of CDRs receiving data signals is derived from the pixel clock.

4. The method of claim 3, further comprising changing from a current phase of the multi-phase clock signal driving the plurality of CDRs receiving data signals in incremental, independent steps of ±1 phase to a correct individual phase in each of the plurality of CDRs receiving data signals.

5. The method of claim 3, wherein clock and data CDR changes are based on a single, multiphase sampling result.

6. The method of claim 1, wherein each data CDR compares a central phase with that of two adjacent phases.

7. The method of claim 6, wherein when the two adjacent phases are different than the central phase, then the central phase is adjusted to its next or previous phase such that the central phase, the two adjacent phases, the next phase, and the previous phase are the same.

8. The method of claim 7, wherein only a center three of the central phase, the two adjacent phases, the next phase, and the previous phase are required to be in a stable region of incoming data for a data CDR to retain its sampling point.

9. The method of claim 1, wherein the dedicated CDR associated with the pixel clock instantaneously changes based on an XOR matrix analysis.

10. The method of claim 1, further including setting an inhibitor flag in each element comprising the plurality of CDRs receiving data signals, when such element is changing phase.

11. The method of claim 10, further including holding a set inhibitor flag while a resulting phase adjustment is processed and propagated through feedback loops in the plurality of CDRs receiving data signals.

12. The method of claim 11, wherein the inhibitor flag is reset after a predetermined number of clock cycles.

13. The method of claim 1, wherein the channel to channel skew comprises skew outside a silicon die implementing the LVDS system.

14. The method of claim 1, wherein the channel to channel skew comprises skew internal to the LVDS system.

15. The method of claim 1, further including triggering phase updates to the plurality of CDRs receiving data signals based on force-up and force-down signals from a clock CDR.

16. The method of claim 15, wherein the force-up and force-down signals allow phase adjustments in the plurality of CDRs receiving data signals even in an absence of data line transitions.

17. The method of claim 16, wherein a direction for the phase adjustments is determined by a minimum difference between old and new clock CDR phases.

* * * * *